United States Patent
Ulrey et al.

(10) Patent No.: US 9,346,451 B2
(45) Date of Patent: May 24, 2016

(54) METHOD AND SYSTEM FOR ENGINE CONTROL

(71) Applicant: Ford Global Technologies, LLC, Dearborn, MI (US)

(72) Inventors: Joseph Norman Ulrey, Dearborn, MI (US); Jianwen James Yi, West Bloomfiled, MI (US); Michael Howard Shelby, Plymouth, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 14/245,940

(22) Filed: Apr. 4, 2014

(65) Prior Publication Data

US 2015/0283990 A1   Oct. 8, 2015

(51) Int. Cl.
| | | |
|---|---|---|
| B60W 10/06 | (2006.01) | |
| B60W 10/08 | (2006.01) | |
| B60W 30/18 | (2012.01) | |
| B60W 20/00 | (2016.01) | |
| B60W 30/192 | (2012.01) | |
| B60W 30/194 | (2012.01) | |

(52) U.S. Cl.
CPC .............. *B60W 10/06* (2013.01); *B60W 10/08* (2013.01); *B60W 20/1082* (2013.01); *B60W 30/18018* (2013.01); *B60W 30/192* (2013.01); *B60W 30/194* (2013.01); *B60W 2710/0616* (2013.01); *B60W 2710/0644* (2013.01); *B60W 2710/0688* (2013.01); *Y10S 903/902* (2013.01); *Y10T 477/23* (2015.01)

(58) Field of Classification Search
None
See application file for complete search history.

(56) References Cited

U.S. PATENT DOCUMENTS

| | | |
|---|---|---|
| 6,014,959 A | 1/2000 | Ma |
| 6,425,365 B1 | 7/2002 | Peters et al. |
| 6,475,365 B2 | 11/2002 | Watanabe et al. |
| 7,689,331 B2 | 3/2010 | Moran |

(Continued)

FOREIGN PATENT DOCUMENTS

| | | | |
|---|---|---|---|
| EP | 1932704 B1 | | 10/2011 |
| JP | 2013060888 A | * | 4/2013 |
| WO | 2013076217 A2 | | 5/2013 |

OTHER PUBLICATIONS

Wooldridge, Steven et al., "Method and System for Improved Dilution Tolerance," U.S. Appl. No. 13/975,068, filed Aug. 23, 2013, 57 pages.
Styles, Daniel J. et al., "Method and System for Improved Dilution Purging," U.S. Appl. No. 14/085,676, filed Nov. 20, 2013, 55 pages.
Styles, Daniel J. et al., "Method and System for Improved Dilution Purging," U.S. Appl. No. 14/085,696, filed Nov. 20, 2013, 55 pages.

(Continued)

*Primary Examiner* — Ramya Burgess
*Assistant Examiner* — David Morris
(74) *Attorney, Agent, or Firm* — Julia Voutyras; Alleman Hall McCoy Russell & Tuttle LLP (57) ABSTRACT

Methods and systems are provided for slowly rotating an engine, unfueled, via a motor prior to an imminent engine restart to heat the engine. By rotating the engine so that heat generated in the compression stroke of a cylinder can be transferred to cylinder walls, thereby expediting engine warm-up. By warming the engine before a restart, particulate emissions generated during an engine cold-start due to direct injection of fuel can be reduced.

19 Claims, 6 Drawing Sheets

(56) References Cited

U.S. PATENT DOCUMENTS

| | | |
|---|---|---|
| 8,467,927 B2 | 6/2013 | Thompson et al. |
| 8,515,608 B2 | 8/2013 | Yamagata |
| 2004/0104058 A1* | 6/2004 | Peters .................. B60K 6/485 180/65.26 |
| 2009/0056429 A1* | 3/2009 | Avallone ................ B60K 6/48 73/114.26 |
| 2012/0023937 A1 | 2/2012 | Styles et al. |
| 2012/0285166 A1 | 11/2012 | Zahdeh |
| 2013/0032127 A1 | 2/2013 | Jentz et al. |
| 2013/0125544 A1 | 5/2013 | Mond et al. |

OTHER PUBLICATIONS

Ulrey, Joseph N. et al., "Method and System for Engine Control," U.S. Appl. No. 14/245,945, filed Apr. 4, 2014, 57 pages.

* cited by examiner

METHOD AND SYSTEM FOR ENGINE CONTROL

FIELD

The present application relates to methods and systems for controlling engine cranking in a hybrid vehicle system.

BACKGROUND AND SUMMARY

Engines may be configured with direct fuel injectors that inject fuel directly into a combustion cylinder (direct injection), and/or with port fuel injectors that inject fuel into a cylinder port (port fuel injection). Direct injection allows higher fuel efficiency and higher power output to be achieved in addition to better enabling the charge cooling effect of the injected fuel.

Direct injected engines, however, can generate more particulate matter (PM) emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. In some operating conditions, the liquid droplet may directly impinge on the combustion surfaces such as the piston, head, and liner. Similarly, the injected fuel does not encounter turbulence when flowing through the valves. Consequently, there may be pockets of rich combustion that may generate soot locally, degrading exhaust emissions. The emissions may be further exacerbated during an engine cold start operation. In particular, until the combustion chamber is fully warmed up, soot is generated due to poor fuel evaporation caused by poor fuel injector spray characteristics at low fuel rail pressure and/or fuel impacting the cold metal surfaces of the combustion chamber.

Engine testing data indicates that PM emissions can be reduced by increasing fuel rail pressure since the fuel pump is typically camshaft driven and the engine must be rotated to pump fuel. One example approach for increasing fuel rail pressure before an engine start is shown by Birch et al. in WO 2013076217. Therein, during braking of a hybrid electric vehicle operating in an electric mode, at least a portion of the negative torque is used to intermittently crank the engine, thereby improving engine lubrication and fuel rail pressure.

However the inventors herein have identified potential issues with such an approach. As an example, even with fuel rail pressure adjusted, there may not be sufficient heating of the combustion chambers to substantially reduce PM emissions during the subsequent engine restart. For example, the engine may not be rotated to a position, or maintained at a position, where sufficient heat transfer can occur. As such, engine testing data further indicates that PM emissions can be greatly reduced by engine heating. Thus even with high fuel pressure, if the combustion chamber is not sufficiently heated, there may still be soot emissions during the engine restart. In addition, due to engine start time requirements, the number of engine rotations allowed prior to a first fuel injection to the engine may be limited, limiting the increase in fuel rail pressure to below an optimum level.

In one example, some of the above issues may be at least partly addressed by a method for operating a hybrid vehicle system comprising: while propelling a hybrid vehicle via only motor torque, rotating an engine unfueled at lower than a threshold speed until a piston temperature is higher than a threshold. In this way, slow engine rotation can be used to sufficiently heat an engine before a restart, improving PM emissions from the engine during direct fuel injection on the subsequent engine restart.

As an example, while operating a hybrid vehicle in an electric mode, and while a cylinder piston temperature is below a threshold temperature, the engine may be slowly cranked, unfueled, via the hybrid vehicle's motor/generator to prepare the engine for an imminent engine start. In one example, the slow cranking may be initiated at least 2-3 minutes before an engine start. The engine is rotated slowly so that all the cylinders get warm as they go through respective compression and expansion strokes. As such, each compression stroke of the engine causes the compressed air to get hot and transfer heat to the cylinder head and piston. Even though the absolute amount of heat transferred to the engine may be low, the heat is transferred directly to a location where heating reduces soot emissions. Thus, during the slow rotating of the engine unfueled, each engine cylinder is heated via compression stroke heating. As such, the engine may be rotated at a lower than threshold speed for the pre-heating via the motor/generator of the hybrid vehicle. In particular, the engine may be rotated slower than the engine would be rotated via a starter motor during engine cranking prior to a restart. For example, during a typical starter motor start, the engine may be cranked at 150 rpm, while during the slow cranking via the hybrid vehicle motor, the engine may be initially cranked at 10 rpm (to the first position) and then cranked at 30 rpm to subsequent positions. Additionally, during the slow cranking, an intake throttle may be maintained closed so that the compressed aircharge is pulled back into the engine with no net flow to the exhaust. Optionally, an EGR valve may also be opened so as to recirculate flow back to the engine and reduce engine vacuum. By slowly rotating each cylinder through a compression stroke, the engine acts as a heat pump and at the bottom of the exhaust stroke, the cylinder aircharge may become cooler than ambient. However, over each cylinder cycle, a net cylinder piston heating may result. Once the engine cylinders have been sufficiently warmed, and the piston temperature is above the threshold, cylinder fuel injection may be resumed to restart the engine. In some examples, after the initial engine slow rotation, the engine may be further rotated to preposition the engine for the imminent engine start. For example, the engine may be rotated to a position that improves engine restartability before cylinder fueling is resumed.

In this way, an engine may be rotated slowly so that the heat from compression is given time to heat the cylinder chamber. By slowly turning an engine for an extended period prior to an engine start, heat generated during a cylinder compression stroke can be transferred to cylinder walls and used to heat the engine in anticipation of an engine start. By pre-heating the engine, particulate emissions from the engine can be reduced, particularly during an engine cold-start. In addition, fuel pressure can be raised to an optimum value for the start, improving fuel injector spray characteristics during the restart. Overall, cold-start emissions can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
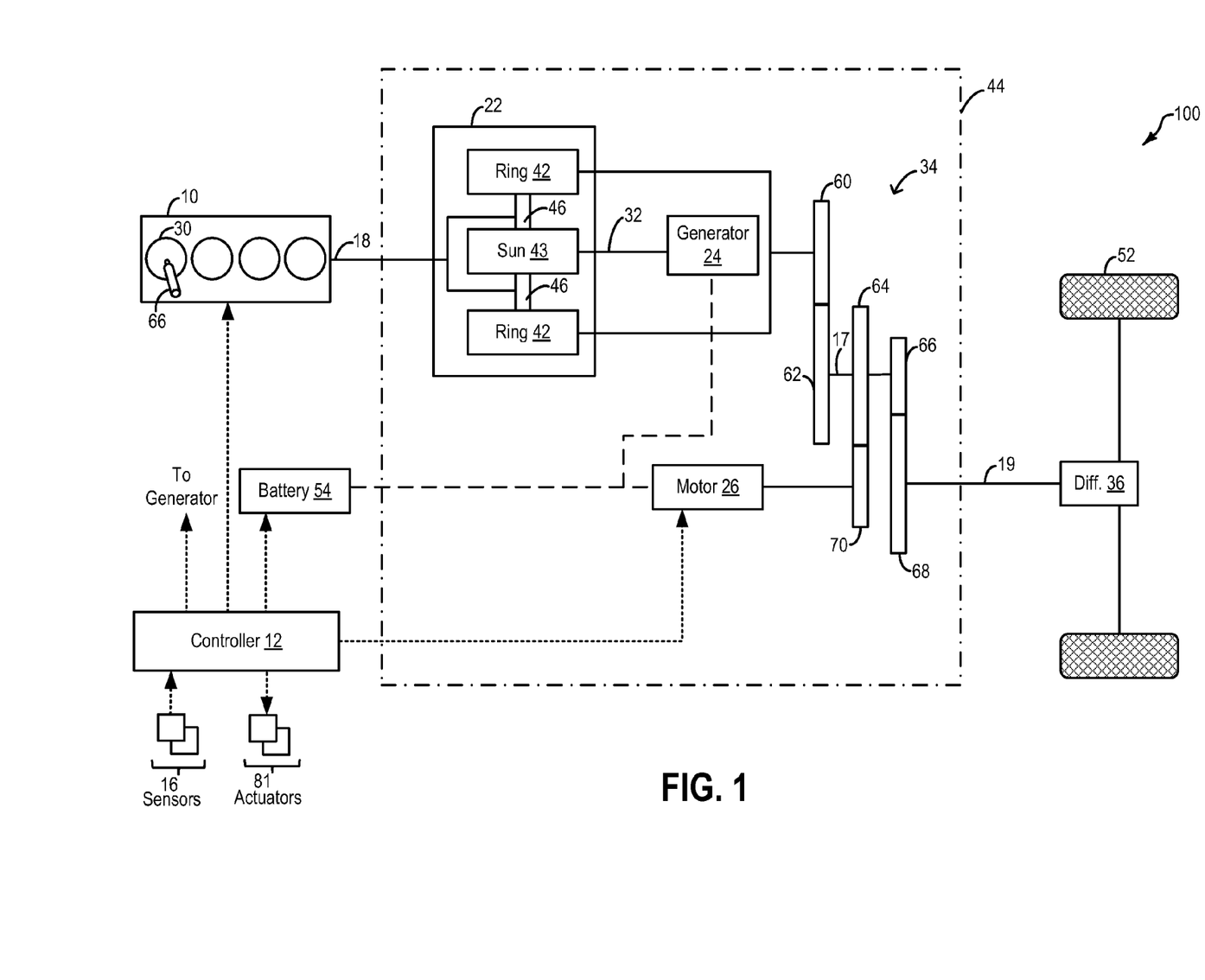
FIG. 1 shows an example hybrid vehicle system layout.
Figure 2:
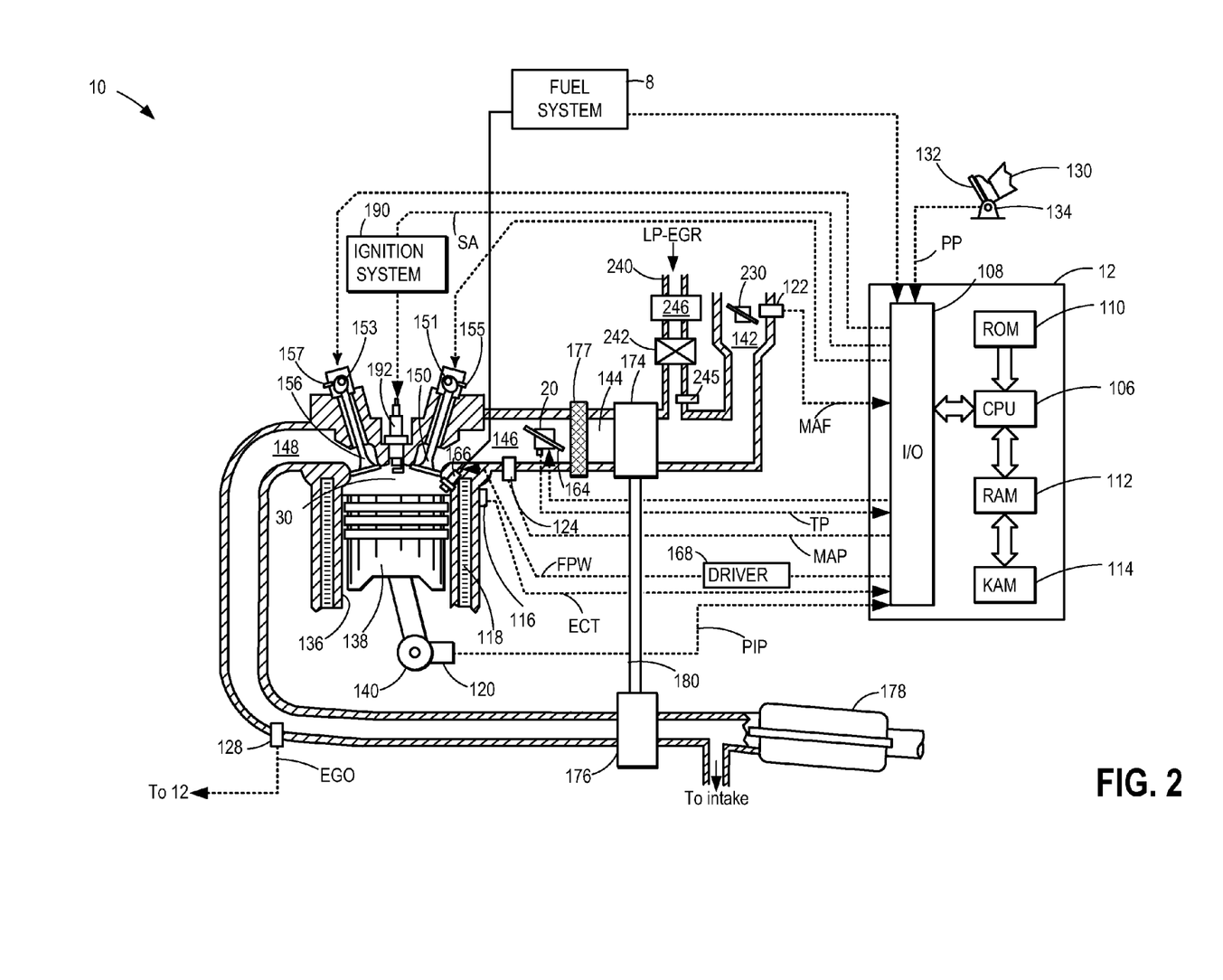
FIG. 2 shows a partial engine view.

The following description relates to systems and methods for reducing particulate emissions from an engine, such as the engine system of FIG. 2, coupled in a hybrid vehicle system, such as the plug-in hybrid electric vehicle of FIG. 1. A controller may be configured to perform a routine, such as the example routines of FIGS. 3-4, to rotate the engine, unfueled, during vehicle operation using motor torque, so as to use compression stroke heat transfer (FIG. 6) to heat engine combustion chambers while also raising fuel pressure. The engine may then be further rotated to preposition the engine for the engine restart. An example engine rotation operation is shown at FIG. 5. In this way, the quality of exhaust emissions, particularly during cold-starts, is improved.

FIG. 1 depicts a hybrid propulsion system 100 for a vehicle. In the depicted embodiment, the vehicle is a hybrid electric vehicle (HEV). Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine 10 delivers power to transmission 44 via torque input shaft 18. In the depicted example, transmission 44 is a power-split transmission (or transaxle) that includes a planetary gearset 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine.

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in an engine mode wherein engine 10 is operated used as the primary source of torque for powering wheels 52. During the engine mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Additionally, the engine can be operated to output more torque than is needed for propulsion, in which case the additional power is absorbed by the generator (in generating mode) to charge the battery 54 or supply electrical power for other vehicle loads.

In another example, the vehicle may be driven in an assist mode wherein engine 10 is operated and used as the primary source of torque for powering wheels 52 and the electric motor is used as an additional torque source to act in cooperation with, and supplement the torque provided by, engine 10. During the assist mode, as in the engine mode, fuel is supplied to engine 10 so as to spin the engine fueled and provide torque to the vehicle wheels.

In still another example, the vehicle may be driven in an engine-off or electric mode wherein battery-powered electric motor 26 is operated and used as the only source of torque for driving wheels 52. As such, during the electric mode, no fuel may be injected into engine 10 irrespective of whether the engine is spinning or not, and the vehicle is propelled with motor torque only. The electric mode may be employed, for example, during braking, low speeds, low loads, while stopped at traffic lights, etc. Specifically, motor power is delivered to gear element 70, which in turn drives the gear elements on countershaft 17, and thereon drives wheels 52.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Additional sensors and actuators are elaborated at FIG. 2. Controller 12 may receive input data from the various sensors, process the input data, and trigger the actuators in response to the processed input data based on instruction or code programmed therein corresponding to one or more routines. Example control routines are described herein with regard to FIGS. 3-4.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Specifically, the generator 24 (of FIG. 1) and driveline including motor 26 (of FIG. 1) may be coupled to the crankshaft and provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174. In some embodiments, as elaborated with reference to FIG. 3, a charge air cooler (CAC) may be located downstream of compressor 174 and upstream of throttle 20 for cooling a boosted aircharge delivered to the engine. Alternatively, the CAC can be located downstream of the throttle integrated in the intake manifold 146.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Further, in the disclosed embodiments, an EGR system may route a desired portion of air charge or exhaust gas from exhaust passage 148 to air induction passage 142. FIG. 2 shows an LP-EGR system wherein LP-EGR is routed through LP-EGR passage 240 from downstream of turbine 176 to upstream of compressor 174. The amount of LP-EGR provided to intake passage 142 may be varied by controller 12 via LP-EGR valve 242. Likewise, there may be an HP-EGR system (not shown) wherein HP-EGR is routed through an HP-EGR passage from upstream of turbine 176 to downstream of compressor 174. The amount of HP-EGR provided to intake passage 146 may be varied by controller 12 via a dedicated HP-EGR valve. The HP-EGR system may include an HP-EGR cooler and the LP-EGR system may include LP-EGR cooler 246 to reject heat from the EGR gases to engine coolant, for example.

EGR sensors may be arranged within EGR passages and may provide an indication of one or more of mass flow, pressure, temperature, concentration of $O_2$, and concentration of the exhaust gas. In some embodiments, one or more sensors may be positioned within LP-EGR passage 240 to provide an indication of one or more of a pressure, temperature, and air-fuel ratio of exhaust gas recirculated through the LP-EGR passage. Exhaust gas diverted through LP-EGR passage 240 may be diluted with fresh intake air at a mixing point located at the junction of LP-EGR passage 240 and intake passage 142. Specifically, by adjusting LP-EGR valve 242 in coordination with a low pressure air-induction system (LP AIS) throttle 230, a dilution of the EGR flow may be adjusted. A percent dilution of the LP-EGR flow may be inferred from the output of a sensor 245 in the EGR gas stream.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines are described herein at FIGS. 3-4.

As such, direct injected engines can generate a large amount of particulate matter (or soot) especially during cold start operations. This is in part due to poor fuel injector spray characteristics at the low fuel pressures of an engine start. In addition, soot is generated due to fuel impacting the cold metal surfaces of the combustion chamber during the start. Soot generation can be substantially reduced by engine heating and fuel pressurization. However, this may be difficult to achieve before an engine start due to the large mass of the engine and the limited time and power available before an engine start. Likewise, engine rotation is required to build fuel pressure since the fuel pump is typically camshaft driven. However, start time requirements may limit the number of engine rotations allowed prior to a first fuel injection, resulting in less than optimum fuel pressures at engine start.

In hybrid vehicle systems, the engine is left off until power to accelerate (in addition to the power provided by the vehicle motor) is required. The inventors herein have recognized that the delay incurred in transitioning from an engine-off mode (e.g., electric mode) to an engine-on mode (e.g., an assist mode) in a hybrid vehicle may be sufficient to opportunistically prepare the engine for the imminent engine restart. In particular, during that time delay, the engine may be turned slowly, such as at a speed lower than the speed at which the engine is rotated during cranking (at an engine restart) via an engine starter motor. The engine may be rotated slowly via the motor (such as motor 20) using energy from a system energy storage device (such as storage device 50), including system batteries. Alternatively, the engine may be rotated during vehicle slowing or deceleration events to recover energy that would otherwise be lost via wheel braking.

The slow rotation may allow each engine cylinder to be sequentially rotated through a cylinder compression stroke. Consequently, heat generated from air compressed in each cylinder during the respective compression stroke (as detailed at FIG. 6) can be effectively transferred to the cylinder walls. As such, this allows the cylinder wall temperature and the cylinder charge temperature to be rapidly equilibrated and the cylinder piston to be warmed. In an alternate example, the engine may be slowly rocked (that is, a direction of rotation may be frequently alternated while rotating the engine slowly) so that each cylinder can go through the compression stroke. In this way, the engine can be slowly rotated so that all cylinders of the engine can be heated before an engine restart. During the subsequent engine restart, when fuel injection is resumed, the fuel impacting the warmer walls of the cylinder may result in lowered soot emissions. In addition, the multiple slow rotations may enable the fuel rail pressure to be sufficiently raised, improving fuel injector spray characteristics.

Figure 3:
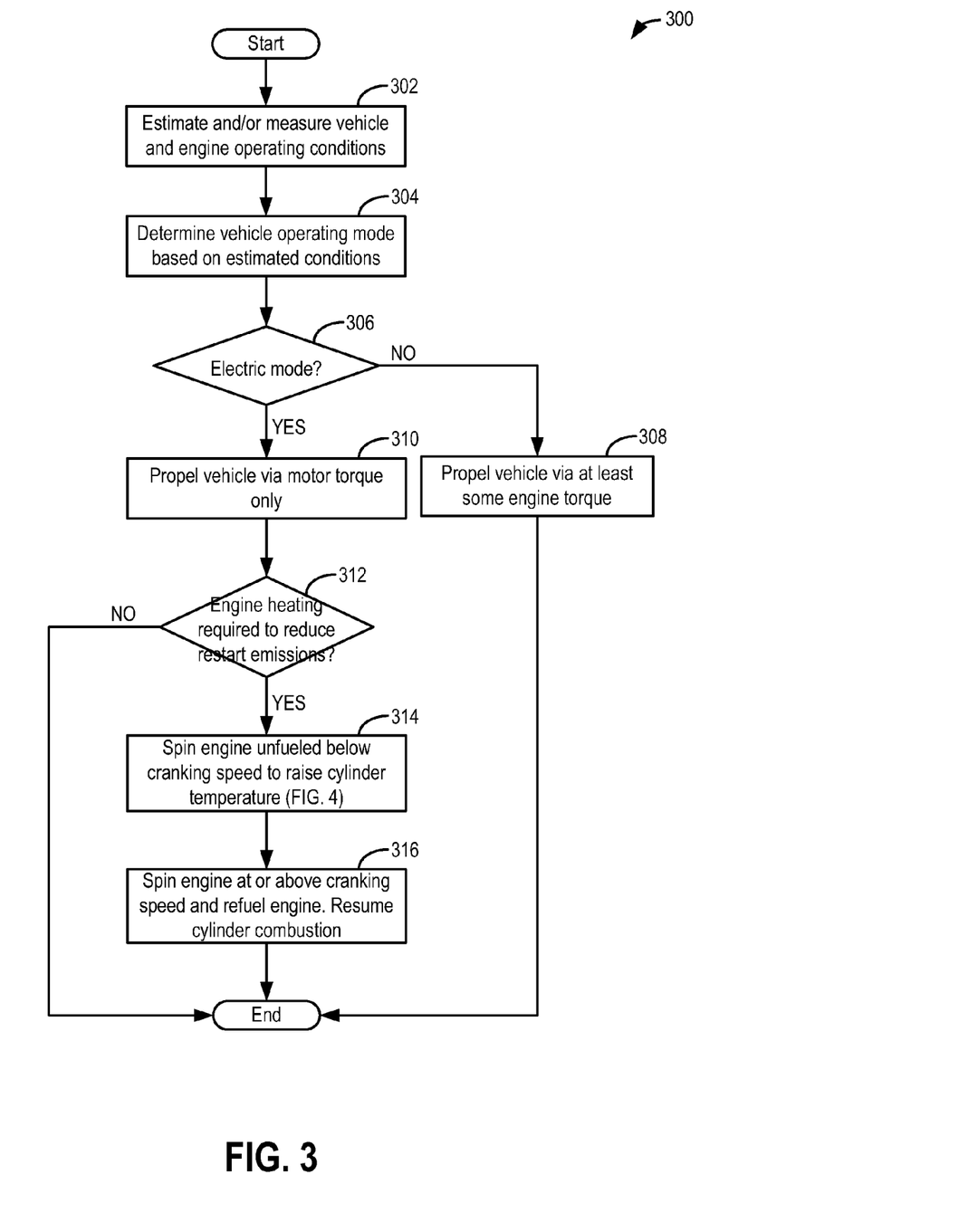
FIGS. 3-4 illustrate an example method for heating an engine before an engine start by slowly rotating the engine, unfueled, via motor torque.

Now turning to FIG. 3, an example routine 300 is shown for slowly cranking an engine prior to an engine restart to enable compression heating of the engine. In this way, soot emissions upon direct injection of fuel during the subsequent engine restart can be reduced.

At 302, vehicle and engine operating conditions may be estimated and/or measured. These may include, for example, a brake pedal position, accelerator pedal position, operator torque demand, battery state of charge (SOC), engine temperature (Teng), ambient temperature and humidity, barometric pressure (BP), etc. In one example, the hybrid vehicle system is a power split hybrid vehicle system.

At 304, a vehicle mode of operation may be determined based on the estimated operating conditions. For example, based at least on the estimated driver torque demand and the battery state of charge, it may be determined whether the vehicle is to be operated in an engine-only mode (with the engine driving the vehicle wheels), an assist mode (with the battery assisting the engine in driving the vehicle), or an electric-only mode (with only the battery driving the vehicle). In one example, if the demanded torque can be provided by only the battery, the vehicle may be operated in the electric-only mode with the vehicle being propelled using motor torque only. In another example, if the demanded torque cannot be provided by the battery, the vehicle may be operated in the engine mode, or in the assist mode where the vehicle is propelled with at least some engine torque. The vehicle may accordingly be operated in the determined mode of operation.

At 306, it may be confirmed that the vehicle is in the electric mode. If the electric mode is not confirmed, at 308, the hybrid vehicle may be propelled with at least some engine torque. For example, the vehicle may be propelled with only engine torque (e.g., in the electric mode) or a combination of engine torque and motor torque (e.g., in the assist mode). If the electric mode is confirmed, at 310, the routine includes propelling the hybrid vehicle via only motor torque.

At 312, engine cylinder temperatures may be estimated, inferred, or modeled and it may be determined if engine heating is required to reduce emissions on the subsequent engine restart. In one example, cylinder piston temperatures may be assessed and it may be determined that heating is required if the piston temperature is below a threshold temperature. In another example, cylinder wall temperatures may be compared to a cylinder charge temperature and it may be determined that heating is required if the difference in cylinder wall temperature and cylinder charge temperature is higher than a threshold amount. In still further examples, while propelling the vehicle with motor torque, it may be determined if an engine start is imminent. For example, based on operating conditions such as an operator pedal position, a battery state of charge, etc., it may be determined if the engine will need to be restarted to meet the operator torque demand. If the engine cylinder temperatures indicate that further heating is not required and/or if an imminent engine restart is not confirmed, the routine may end.

If heating is required, at 314, in anticipation of the imminent engine restart, the controller may rotate the engine unfueled to raise piston temperatures before the restart. As elaborated at FIG. 4, the controller may rotate the engine unfueled via motor torque slowly (at lower than a threshold speed, such as lower than engine cranking speed) so that each cylinder is heated via compression heating during a compression stroke of the cylinder. As such, during the slow rotation, each of cylinder of the engine is gradually rotated to a first position where the cylinder is in a compression stroke, and maintained at the first position transiently so that a temperature of the walls and charge of the cylinder can be equilibrated. The slow rotation allows each cylinder to be likewise rotated to and transiently held in the compression stroke where the cylinder is heated. As such, the cylinder may then get cooled as the cylinder then continues to rotate into the subsequent expansion stroke. However, the cylinder may be heated more in the compression stroke than the cylinder is cooled during the expansion stroke, allowing for a net heating of the cylinder via the slow rotation. In this way, the slow rotation enables a heat pump effect in the cylinder. The slow rotation of the engine may advantageously use heat generated in the compression stroke of the selected cylinders to heat the combustion chamber, and thereby pre-heat the engine before the engine restart. By heating the engine before the restart, cold-start particulate matter emissions resulting from direct injection of fuel onto cold combustion chamber surfaces, can be reduced. In addition, fuel pressure can be raised, which improves fuel spray characteristics, and thereby further reduces soot generation.

In another example, the engine rotation may be performed so that a first engine cylinder goes through the compression stroke, the first cylinder having a piston positioned closest to compression stroke BDC. For example, the first cylinder being compression heated may have a piston positioned before or immediately after compression stroke BDC an engine cylinder. The first cylinder may then be rotated to near TDC of the compression stroke. It may be desirable to transiently dwell at TDC to reduce the torque required to maintain the engine at a fixed position.

At 316, after sufficiently pre-heating the engine, the engine may be optionally prepositioned via the motor. Specifically, the engine may be spun unfueled to a position from where engine restartability is improved. For example, the engine may be spun so that an engine cylinder is at or near intake valve closing (IVC). This allows the cylinder to be compressed during the engine cranking preceding an engine restart and cylinder firing can occur in less than 180 degrees. In an alternate example, the cylinder may be rotated so that the piston is at or near TDC of fueling and compressed. The cylinder may then be waiting for spark. However, in the latter example, there may be some leak down. In still another example, the engine may be spun so that an engine cylinder is at the beginning of a compression stroke where the cylinder is ready for receiving fuel via direct injection, or part way through an exhaust stroke where the cylinder is ready for receiving fuel via port injection. Once the engine is prepositioned, the engine may be restarted if required. For example, the engine may be restarted due to an increase in operator torque demand that cannot be met via a motor or battery of the hybrid vehicle system. Alternatively, the engine may be restarted due to a drop in the battery state of charge. Further still, the engine may be restarted to operate an air compressor to meet HVAC needs. Once engine restart conditions are met, the engine may be cranked and fueled so that engine combustion can be restarted.

Figure 4:
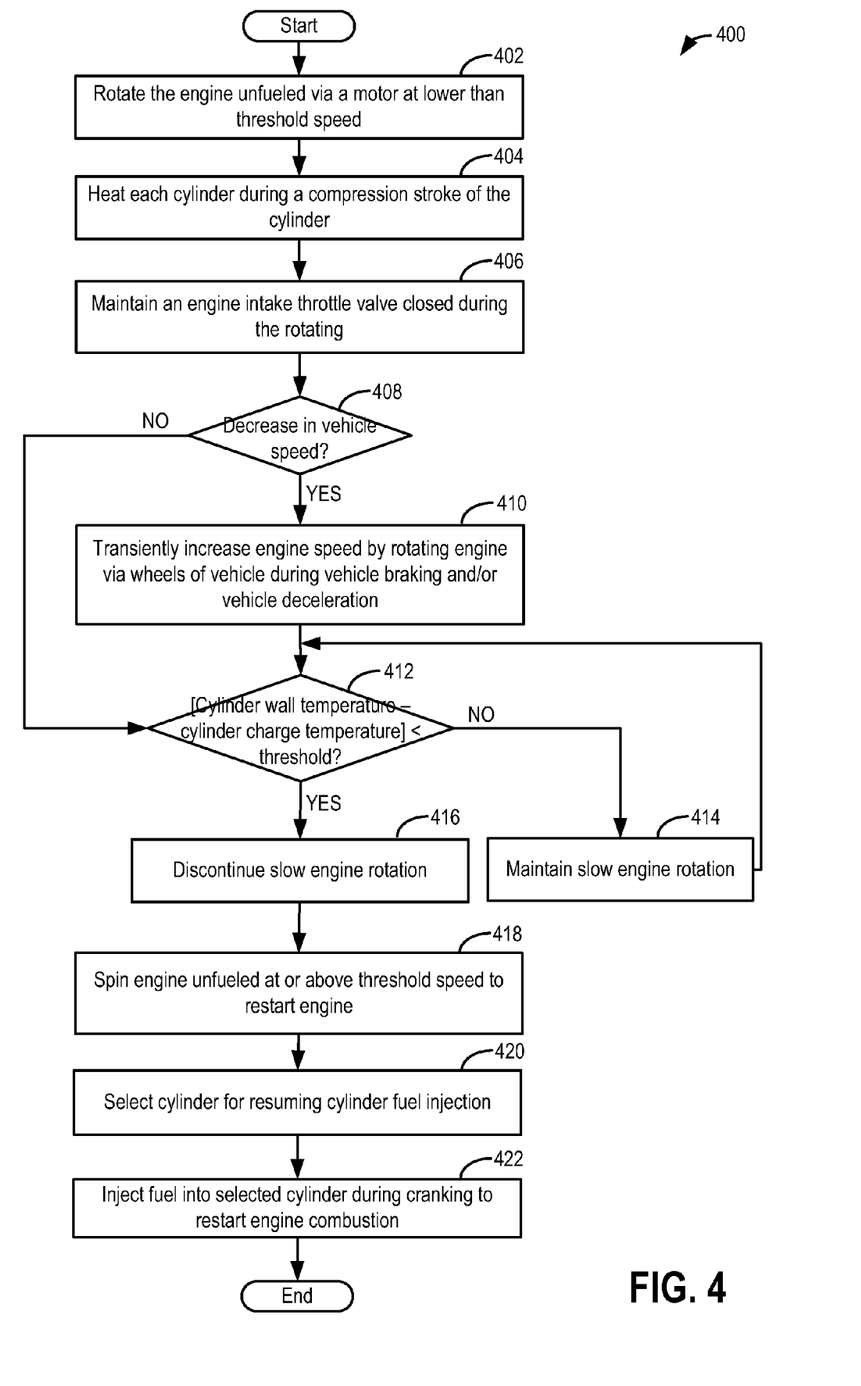
Figure 5:
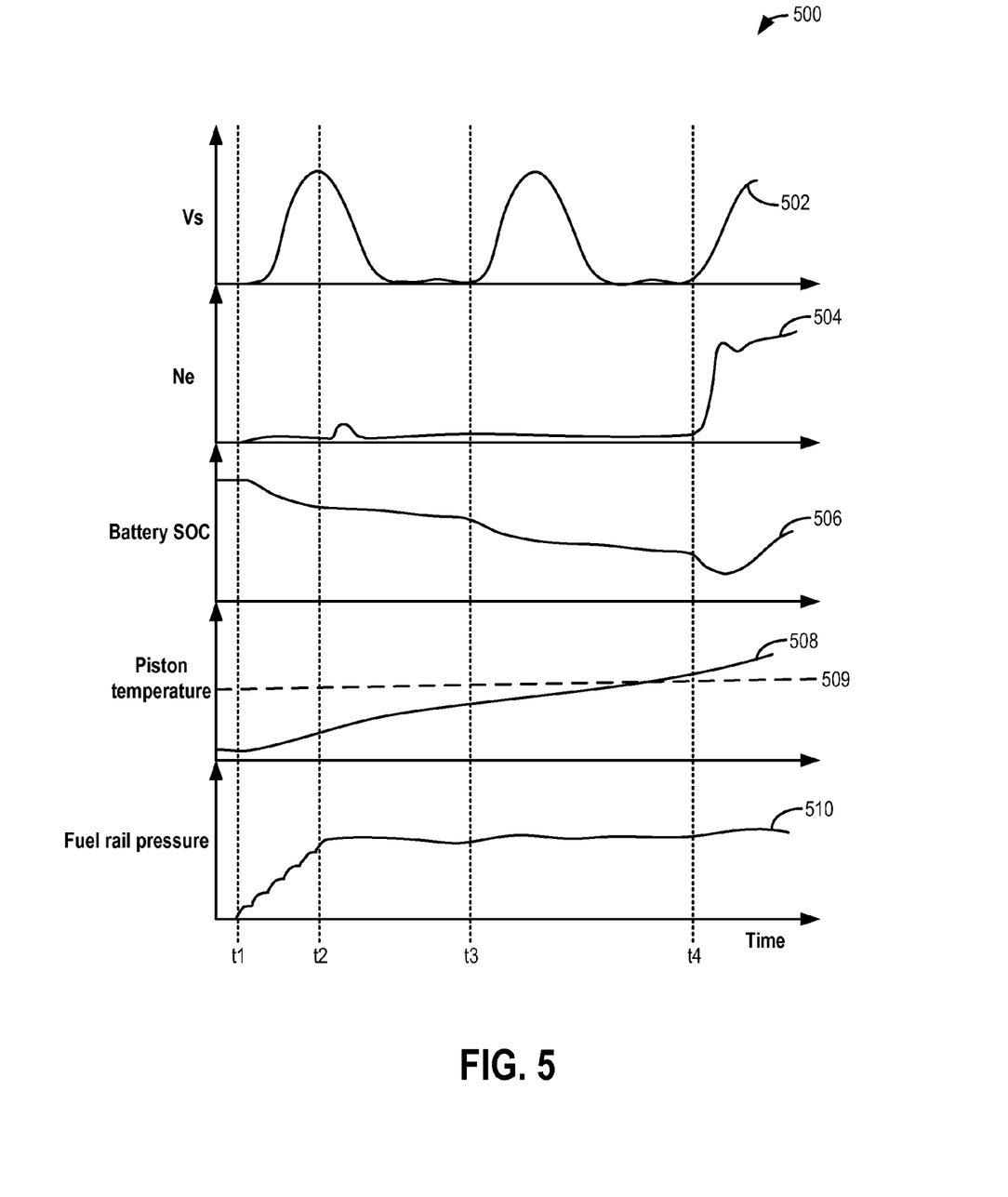
FIG. 5 illustrates an example engine heating operation to reduce particulate matter emissions from a hybrid vehicle system.

Now turning to FIG. 4, an example routine 400 is shown for rotating an engine slowly, and unfueled, to better prepare an engine for an imminent engine restart by heating the engine and raising a fuel rail pressure. This allows particulate emissions from the engine to be reduced when the engine is subsequently restarted.

At 402, the method includes rotating the engine slowly via a motor of the hybrid vehicle before an imminent engine restart and while the vehicle is being propelling with motor torque. Herein, the motor may be propelling the vehicle and rotating the engine. As previously elaborated, the engine may be rotated at lower than a threshold speed. The threshold speed may be, in one example, an engine cranking speed. That is, the engine may be spun at a speed slower than the speed at which the engine would have been spun by a starter motor during engine crank and restart. For example, during engine cranking, the engine may be rotated unfueled via a starter motor at 150 rpm. In comparison, during the slow rotating for cylinder heating, the engine may be rotated at 10-30 rpm via the electric motor/generator of the hybrid vehicle. In alternate examples, the threshold speed at or below which the engine is slowly rotated may be higher or lower based on operating parameters such as oil temperature, ambient temperature, or NVH.

In one example, slow engine rotating may be initiated in a cylinder (e.g., a first cylinder) selected based on a proximity of a cylinder piston position relative to a compression stroke TDC. For example, a controller may identify a cylinder having a piston positioned closest to compression stroke TDC or at a position where at least a threshold level of compression is experienced. At 404, the routine includes rotating the engine so that each cylinder is sequentially heated during a compression stroke of the cylinder. As rotation continues, each cylinder may be cooled during an expansion stroke of the cylinder, immediately following the compression stroke. However, the cylinder may be heated more during the compression stroke than the cylinder is cooled during the expansion stroke allowing for a net heating of each cylinder via a heat pump effect. As such, during a compression stroke of each cylinder, air-charge is compressed, generating heat. By rotating an engine so that a cylinder is held in the compression stroke, heat from the compressed air can be transferred to the cylinder walls, cylinder head, and piston, raising engine temperature.

At 406, the routine includes maintaining an engine intake throttle valve closed during the rotating. Closing the intake throttle allows the compressed aircharge to be pulled back into the engine with no net flow out of the exhaust. As such, this reduces the potential for emissions that could be trapped in the crankcase. In still further examples, during the slow engine rotation, an EGR valve of the engine's EGR system (such as LP-EGR valve 242 of FIG. 2) may be at least partially opened. By opening the EGR valve, flow out of the cylinder is recirculated back to the engine, reducing engine vacuum. Herein, air is pumped in a closed circle. By allowing the heat of compression to be removed at TDC upon expansion, the charge is rendered cooler than when the compression started. The charge can then be pushed out of the engine tailpipe or recirculated through the EGR system so that the same charge is used again and again. This limits the potential for hydrocarbons in the exhaust. On a naturally aspirated engine equipped with a conventional EGR system, the EGR valve could be held open during the heating cycle to reduce or even eliminate the net airflow through the engine.

In some embodiments, during the rotating, intake and/or exhaust valves of one or more engine cylinders may be deactivated so that multiple cylinders may be heated via compression at a given time. As such, on a 4-cylinder in-line engine, compression strokes of successively firing cylinders are 180 CAD apart. Thus, if the engine is equipped with deactivation mechanisms that allow one or more engine cylinders to be selectively deactivated (e.g., via deactivatable cylinder valves), more than 1 cylinder can be placed on a "compression" stroke at the same time. In other words, on a 4-cylinder engine, it may be possible to heat two cylinders at the same dwell position. For example, in the 4-cylinder in-line engine where the firing order is 1-3-4-2, cylinders 1 and 4 can be heated together while cylinders 2 and 3 are heated together.

At 408, it may be determined if there is a decrease in vehicle speed. For example, it may be determined if there is a vehicle braking or vehicle deceleration event. If yes, at 410, the engine may be rotated via the wheels during vehicle braking or vehicle deceleration. Herein, wheel torque that would have otherwise been dissipated as heat or used for regenerative braking may be advantageously used for engine rotation. In addition, during one of the vehicle braking and vehicle deceleration event, the routine includes transiently increasing the engine speed (of the unfueled engine rotation) by rotating the engine via the wheels of the hybrid vehicle. While the routine suggests rotating the engine via motor torque and opportunistically further rotating the engine via the wheels during vehicle braking or deceleration, in other examples, the engine may only be selectively rotated, unfueled, at lower than the threshold speed during vehicle braking or deceleration events that occur while the vehicle is propelled via motor torque. The routine then proceeds to 412. If a drop in vehicle speed is not confirmed at 408, the routine proceeds directly to 412. At 412, it may be determined if the engine cylinders have been sufficiently warmed. For example, it may be determined if a piston temperature is higher than a threshold or if a temperature difference between cylinder walls and cylinder charge is lower than a threshold. The temperature difference may be based on temperatures that are estimated or inferred. Further still, the temperature difference may be implemented via a simple timer. For example, it may be determined that sufficient cylinder heating has occurred if each cylinder spends more than a threshold time at the compression stroke. In an alternate example, the engine temperature or an average cylinder piston temperature may be assessed (e.g., compared to a threshold temperature). If the piston temperature is higher than the threshold (or if the temperature difference in the cylinder is lower than the threshold), at 416, the routine includes discontinuing the slow engine rotation. Else, at 414, the routine includes continuing to rotate the engine unfueled at slower than the threshold speed until the temperature difference between cylinder walls and cylinder charge is lower than the threshold (or until the engine temperature or average cylinder piston temperature is higher than the threshold temperature).

In some examples, the controller may also determine if an engine fuel rail pressure is higher than a threshold pressure. If not, the routine may maintain the unfueled engine rotation at slower than the threshold speed until the fuel rail pressure is above the threshold pressure. However, since fuel rail pressure can build within a number (e.g., five to ten) pump strokes of the engine, and since a threshold number of pump stroke (e.g., two) are achieved on each engine revolution, the fuel rail pressure may reach the threshold pressure by the time the cylinder temperature is sufficiently raised.

After all the engine cylinders have been warmed, if restart conditions are met, the routine includes resuming cylinder fuel injection to restart the engine. For example, at 418, the routine includes rotating the engine unfueled at or above the threshold speed. For example, the engine may be rotated at the engine cranking speed via a starter motor of the engine. At 420, the routine may optionally include selecting an engine cylinder in which to resume cylinder fueling. The cylinder may be selected based on a piston position. For example, a cylinder that is at or close to IVC may be selected. At 422, fuel may be injected into the selected cylinder during engine cranking to restart the engine. It will be appreciated that in an alternate example, the engine may not select an engine cylinder to resume cylinder fueling but may resume fueling as and when required.

It will be appreciated that in still further examples, after slowly rotating the engine for cylinder heating, the routine may include further rotating the engine unfueled via the vehicle motor to a position that is optimal for engine restartability. For example, the engine may be rotated to a position from where the engine can be rapidly restarted if engine restart conditions are not met immediately after the cylinder has been warmed. In one example, the further rotating may include rotating to a position where an engine cylinder is at or near IVC. In this way, a method is provided for an engine comprising: while propelling a hybrid vehicle via only motor torque, and in anticipation of an imminent engine restart, rotating an engine unfueled at lower than an engine cranking speed until piston temperature is higher than a threshold; and after the piston temperature is higher than the threshold, restarting the engine by resuming cylinder fueling. Herein, rotating the engine unfueled at lower than an engine cranking speed includes rotating the engine at between 10 and 30 rpm. The threshold is based on intake aircharge temperature. Rotating the engine includes rotating the engine via a motor of the hybrid vehicle. The method further comprises, maintaining an engine intake throttle closed while the engine is rotated at lower than the engine cranking speed. In embodiments where the engine includes an EGR passage for recirculating aircharge from an engine exhaust to an engine intake, the method further comprises, maintaining an EGR valve of the EGR passage open while the engine is rotated at lower than the engine cranking speed. In this way, by expediting cylinder heating, particulate emissions from an engine are reduced during an engine restart with at least some direct injection of fuel into an engine cylinder.

Figure 6:
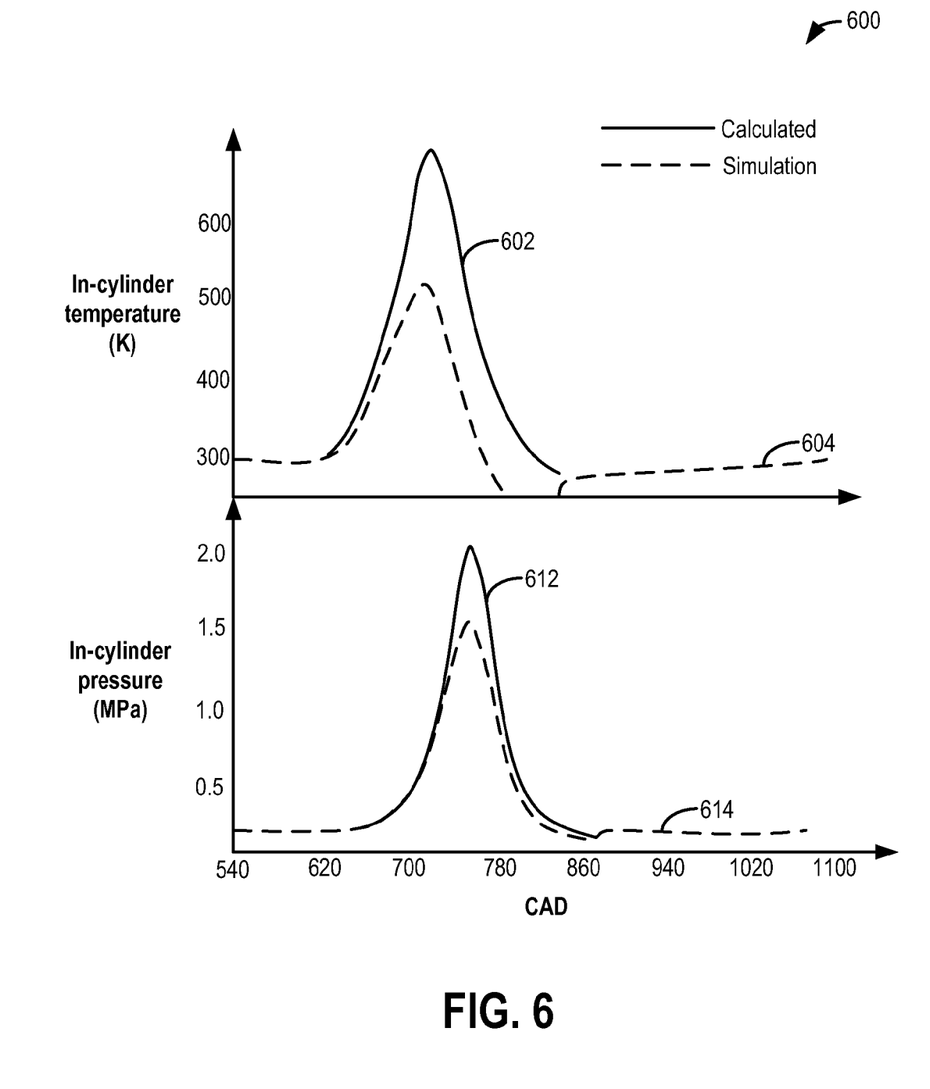
FIG. 6 illustrates an example map of cylinder heating during compression stroke.

FIG. 6 graphically depicts the compression stroke heating effect at map 600. In particular, a first set of plots 602-604 are shown depicting the change in an in-cylinder temperature as the cylinder is rotated through compression stroke. A second set of plots 612-614 depict the change in an in-cylinder pressure as the cylinder is rotated through the compression stroke. In the depicted example, the engine is rotated slowly at 30 rpm. In each set, plots 602 and 612 (solid lines) show the calculated data while plots 604 and 614 (dashed lines) show the simulated data. The calculated data represents a scenario where no heat flows and no heat is transferred to the cylinder walls and the piston. In comparison, the simulated data represents a scenario where heat flows and heat is transferred to the cylinder walls and the piston. The plotted ideal curves start at intake valve closing (IVC; at around 625CAD) and end at exhaust valve opening (EVO; at around 832CAD). The calculated curves (plots 604, 614) were based on the isentropic process and volume ratio. The ideal curves (plots 602, 612) are then recalculated with P1 and V1 of the isentropic process and volume ratio at IVC. As can be seen, significant amounts of heat are transferred to the cylinder walls and pistons during the compression stroke, even though some cooling occurs after the compression stroke. In particular, the simulated data shows how heat is lost from the compressed air as it flows to the cylinder walls and pistons with a consequent drop in in-cylinder temperature. Furthermore, the heat is transferred directly to the location where the heat transfer has significant effect on PM emissions. This heat transfer is used to advantageously raise piston temperature. In particular, the compression stroke heating is repeated over multiple cycles until the piston temperature is above a threshold temperature. Therefore, during the slow engine rotation, each cylinder is allowed to be heated during the cylinder's compression stroke. Consequently, when the engine is restarted and fuel is delivered to the pre-heated cylinder, the liquid fuel droplets may directly impinge on hot combustion surfaces, leading to improved fuel evaporation.

An example engine rotation is now shown at map 500 of FIG. 5. Map 500 depicts vehicle speed at plot 502, engine speed at plot 504, a battery state of charge (SOC) at plot 506, a cylinder piston temperature at plot 508, and fuel rail pressure at plot 510. All plots are shown over time along the x-axis. Vehicle propulsion may be started at t1. At the time of vehicle propulsion, engine start conditions may not be met and the vehicle may be propelled via motor torque only. For example, the vehicle may be a hybrid vehicle being operated in an electric mode. Between t1 and t2, as operator demand and vehicle speed correspondingly vary, the battery SOC may vary with the battery SOC being reduced at a higher rate when the vehicle speed increases. As such, while the vehicle is propelled using motor torque between t1 and t2, the piston temperature may be below threshold temperature 509. To enable cylinder heating, to thereby reduce PM emissions and improve engine performance when the engine is subsequently operated, the engine may also be spun slowly, unfueled via the motor starting at t1. As the engine is slowly rotated via the motor, two effects occur. First, the piston temperature is gradually increased. Second, the fuel rail pressure is increased.

After t2, engine rotation is continued but operator torque demand and vehicle speed reduce. As a result, the battery SOC may gradually decrease (at a slower rate) as only engine rotating via motor torque continues. Shortly after t2, a vehicle deceleration event occurs. During this event, instead of dissipating the wheel torque as heat, the engine is rotated via the wheels. Based on the drop in wheel torque occurring during the vehicle deceleration event, at least some of the wheel torque is applied to engine rotation with a transient increase in the speed of engine rotation.

At t3, the vehicle speed increases again but engine restart conditions are not met. In addition, an engine restart is not desired since piston temperature, while warmer than the piston temperature at t1, is still lower than threshold 509. Consequently, a large amount of PM emissions may be generated when fuel is direct injected into the cold cylinder. Thus, the engine restart is delayed and the vehicle continues to be propelled with motor torque only. Between t3 and t4, motor torque is used to slowly rotate the engine and propel the vehicle.

Between t3 and t4, the piston temperature rises above threshold temperature 509. At t4, the vehicle speed increases again and engine restart conditions are considered met. In particular, since the piston is sufficiently warm, an engine restart is enabled. Accordingly, after t4, the engine is cranked faster via a starter motor and cylinder fueling is resumed. Engine speed then increases as the vehicle is propelled with at least engine torque. In addition, engine torque may be used to charge the battery.

In this way, the example of FIG. 5 depicts a method for an engine comprising: delaying an engine restart until a piston temperature is brought above a threshold, or until a difference between engine temperature and engine aircharge temperature (or cylinder piston temperature and cylinder charge temperature) is brought below a threshold amount, via engine rotation, the engine rotated unfueled at lower than an engine cranking speed. The method may further comprise, during the engine restart, rotating the engine unfueled at the engine cranking speed and then resuming engine fueling.

In this way, an engine of a hybrid vehicle may be slowly cranked using a motor during a transition from operating in an electric mode to an engine mode to heat the engine before an engine start. By slowly spinning the engine, unfueled, for a duration before an imminent engine restart, heat generated from air compressed in a cylinder during a compression stroke can be transferred to cylinder walls and pistons, and advantageously used to heat the engine. By warming the engine before an engine start, engine particulate matter emissions resulting from direct injected fuel can be reduced, particularly during an engine cold-start. In addition, fuel pressure can be sufficiently raised. The resulting improvement in fuel injector spray characteristics during the restart further reduces engine particulate matter emissions. Overall, engine cold-start exhaust emissions and engine performance can be improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while propelling a hybrid vehicle via only motor torque, rotating an engine unfueled at slower than a threshold speed until a piston temperature is higher than a threshold, the threshold speed being an engine cranking speed when the engine is rotated unfueled via a starter motor.

2. The method of claim 1, wherein during the rotating, intake and/or exhaust valves of one or more engine cylinders are deactivated so that multiple cylinders may be heated via compression at a given time.

3. The method of claim 1, further comprising, after the piston temperature is higher than the threshold, resuming cylinder fuel injection to restart the engine.

4. The method of claim 3, wherein resuming cylinder fuel injection includes selecting a cylinder for resuming fuel injection based on proximity of a cylinder piston position relative to intake valve closing.

5. The method of claim 1, wherein rotating the engine unfueled includes rotating the engine via a motor of the hybrid vehicle before an imminent engine restart.

6. The method of claim 1, wherein rotating the engine unfueled includes rotating the engine via wheels of the hybrid vehicle during one of vehicle braking and vehicle deceleration.

7. The method of claim 1, further comprising, during one of vehicle braking and vehicle deceleration, transiently increasing an engine speed by rotating the engine via wheels of the hybrid vehicle.

8. The method of claim 1, further comprising, maintaining the unfueled engine rotation at slower than the threshold speed until a fuel rail pressure is above a threshold pressure.

9. The method of claim 1, further comprising, during the rotating, maintaining an engine intake throttle valve closed.

10. The method of claim 1, wherein rotating the engine includes rotating the engine so that each cylinder is heated during a compression stroke of the cylinder and cooled during an expansion stroke of the cylinder, the cylinder heated more during the compression stroke than the cylinder is cooled during the expansion stroke.

11. A method for an engine, comprising:
    while propelling a hybrid vehicle via only motor torque, and in anticipation of an imminent engine restart, rotating an engine unfueled at lower than an engine cranking speed until piston temperature is higher than a threshold; and
    after the piston temperature is higher than the threshold, restarting the engine by resuming cylinder fueling.

12. The method of claim 11, wherein rotating the engine unfueled at lower than the engine cranking speed includes rotating the engine at between 10 and 30 rpm.

13. The method of claim 11, wherein the threshold is based on intake aircharge temperature.

14. The method of claim 11, wherein rotating the engine includes rotating the engine via a motor of the hybrid vehicle.

15. The method of claim 11, further comprising, maintaining an engine intake throttle closed while the engine is rotated at lower than the engine cranking speed.

16. The method of claim 11, wherein the engine includes an EGR passage for recirculating aircharge from an engine exhaust to an engine intake, the method further comprising, maintaining an EGR valve of the EGR passage open while the engine is rotated at lower than the engine cranking speed.

17. A method for an engine, comprising:
    delaying an engine restart until a piston temperature is brought above a threshold via engine rotation, the engine rotated unfueled at lower than an engine cranking speed.

18. The method of claim 17, wherein delaying until the piston temperature is brought above the threshold includes delaying until a difference between cylinder piston temperature and cylinder aircharge temperature is brought below a threshold difference.

19. The method of claim 17, further comprising, during the engine restart, rotating the engine unfueled at the engine cranking speed and then resuming engine fueling.

* * * * *